United States Patent
Chase

(10) Patent No.: US 11,554,775 B2
(45) Date of Patent: Jan. 17, 2023

(54) PASSIVE INFRA-RED GUIDANCE SYSTEM

(71) Applicant: Arnold Chase, West Hartford, CT (US)

(72) Inventor: Arnold Chase, West Hartford, CT (US)

( * ) Notice: Subject to any disclaimer, the term of this patent is extended or adjusted under 35 U.S.C. 154(b) by 0 days.

(21) Appl. No.: 17/713,151

(22) Filed: Apr. 4, 2022

(65) Prior Publication Data

US 2022/0227364 A1    Jul. 21, 2022

Related U.S. Application Data

(63) Continuation-in-part of application No. 16/837,308, filed on Apr. 1, 2020, now Pat. No. 11,294,380.
(Continued)

(51) Int. Cl.
*B60W 30/09* (2012.01)
*G01J 5/10* (2006.01)
(Continued)

(52) U.S. Cl.
CPC ........ *B60W 30/09* (2013.01); *B60W 60/0016* (2020.02); *G01J 5/10* (2013.01); *B60W 2420/40* (2013.01); *G01J 2005/0077* (2013.01)

(58) Field of Classification Search
CPC ............. B60W 30/09; B60W 60/0016; B60W 2420/40; G01J 5/10; G01J 2005/0077
See application file for complete search history.

(56) References Cited

U.S. PATENT DOCUMENTS

| | | | |
|---|---|---|---|
| 2013/0211720 A1* | 8/2013 | Niemz | G01C 21/20 |
| | | | 701/538 |
| 2014/0085476 A1 | 3/2014 | Toyofuku | |

(Continued)

FOREIGN PATENT DOCUMENTS

| | | |
|---|---|---|
| CN | 101327796 A | 12/2008 |
| CN | 103582906 A | 2/2014 |

(Continued)

OTHER PUBLICATIONS

Korean Office Action and its English translation for corresponding Korean Application No. 10-2020-7035179 dated Jul. 25, 2022.
(Continued)

*Primary Examiner* — Dale Moyer
(74) *Attorney, Agent, or Firm* — McCormick, Paulding & Huber PLLC

(57) ABSTRACT

A passive infra-red guidance system and method for augmenting operation of a vehicle on a roadway includes at least one forward-looking infra-red imaging sensor mounted on the vehicle in operative communication with an image processor tied into the vehicle's operational system. The system identifies the presence of one or more melting agents arranged on the roadway using thermal imaging to detect a thermal contrast between the portion(s) of the roadway surface treated with the one or more melting agents and the untreated portion(s) of the roadway surface, determines the left and right edges of the roadway using thermal imaging and determines the centerline of the travel lane in which the vehicle is travelling based on the identified melting agent(s). The system then compares the determined centerline of the travel lane with the actual position of the vehicle and identifies any adjustment needed for the vehicle's position based on the comparison.

20 Claims, 10 Drawing Sheets

Related U.S. Application Data which is a continuation-in-part of application No. 16/415,288, filed on May 17, 2019, now Pat. No. 10,755,576, and a continuation-in-part of application No. 16/356,043, filed on Mar. 18, 2019, now Pat. No. 10,613,545.

(60) Provisional application No. 62/670,209, filed on May 11, 2019.

(51) Int. Cl.
*B60W 60/00* (2020.01)
*G01J 5/00* (2022.01)

(56) References Cited

U.S. PATENT DOCUMENTS

| | | | | |
|---|---|---|---|---|
| 2016/0069743 | A1* | 3/2016 | McQuilkin | G01N 21/255 356/416 |
| 2017/0270375 | A1 | 9/2017 | Grauer | |
| 2017/0371336 | A1* | 12/2017 | Mei | B60W 30/18163 |
| 2020/0017083 | A1* | 1/2020 | Casselgren | G01S 7/4802 |
| 2020/0240795 | A1* | 7/2020 | Nomura | G06T 7/00 |

FOREIGN PATENT DOCUMENTS

| | | |
|---|---|---|
| JP | 2013-114536 A | 6/2013 |
| JP | 2014085920 A | 5/2014 |

OTHER PUBLICATIONS

Korean Office Action and its English translation for corresponding Korean Application No. 10-2020-7035180 dated Jul. 26, 2022.

Japanese Final Office Action and its English translation for corresponding Japanese Application No. 2021-513756 dated Oct. 4, 2022.

Chinese Office Action and its English translation for corresponding Chinese Application No. 201980031744.0 dated Sep. 5, 2022.

* cited by examiner

PASSIVE INFRA-RED GUIDANCE SYSTEM

CROSS-REFERENCE TO RELATED APPLICATIONS

This application is a continuation-in-part of U.S. patent application Ser. No. 16/837,308, filed Apr. 1, 2020, which is a continuation-in-part of U.S. patent application Ser. No. 16/415,288, filed May 17, 2019 and a continuation-in-part of U.S. patent application Ser. No. 16/356,043, filed Mar. 18, 2019, both which claim the benefit of U.S. Provisional Patent Application No. 62/670,209, filed May 11, 2018, each of which is incorporated herein by reference in its entirety.

TECHNICAL FIELD

The present disclosure generally relates to augmenting the operation of autonomous, semi-autonomous and non-autonomous vehicles, and more particularly relates to a system and method for locating a vehicle on a roadway, and adjusting the position and operation of the vehicle accordingly.

BACKGROUND

Many companies are developing autonomous vehicles for commercial and personal use on existing roadways for a variety of applications, including but not limited to personal taxi services, delivery services, and the like. In accordance with the present disclosure, an autonomous vehicle is a vehicle capable of operating without a human driver. Such vehicles can be designed to operate utilizing an onboard computer and a system of sensors designed to drive, steer, and otherwise operate the vehicle in the same manner as if there were a human operator. It is envisioned that fleets of autonomous vehicles will soon be available, similar to a network of taxis, buses or delivery vans, whereby a user can request an autonomous vehicle to pick-up, transport and drop off passengers, or pick-up, transport, and deliver packages or the like, on demand. Alternatively, users can own an autonomous vehicle for personal use and use it for ordinary tasks, such as commuting to work, running errands, dropping the kids off at school, for travel, or the like.

Current autonomous vehicles in the development and testing stages generally utilize multiple systems to fully operate the vehicle without a human operator. First, a standard GPS system is used to plan a route for the vehicle. Taking into account the starting point and the destination for a trip, as well as other factors such as traffic conditions, road closures, weather conditions, preferred routes, toll roads, etc., the GPS system determines the best route for the vehicle to take. However, for safe and efficient operation, autonomous vehicles also need a system to recognize dynamic conditions along the route during operation of the vehicle. Such a system may be referred to as an augmented GPS system, which utilizes an array of technologies, such as cameras, sensors, radar, LIDAR and lasers to provide a three-dimensional view around the vehicle during operation. Such a system can keep track of other cars around the vehicle; detect obstacles or hazards around the car, in the road up ahead, or approaching the car from the front, rear, or sides; and determine the location of the edge of the road or travel lane, upcoming turns, hills or descents, and assess general road conditions ahead, behind and around the vehicle. Autonomous vehicles also require a centralized system within the car to process the information provided from the GPS system and augmented GPS system and utilize the processed information to operate the vehicle. Such commonly utilized systems generally include a Computer Area Network (CAN) bus in the vehicle to communicate with and coordinate operation of the GPS system, augmented GPS system and other autonomous vehicle operating systems.

Non-autonomous vehicles also utilize similar technology to back-up a human driver. For example, cars have used various forms of cruise control for decades. More recently, cars have been equipped with systems that will autonomously parallel park the car. Many modern cars are now equipped with systems that assist the driver when the car begins to drift out of its lane on the highway, or brake the car if it is getting too close to the car in front of it, or alert the driver if there is an object in the road ahead.

Until guidance systems on-board autonomous vehicles match or exceed the perception and analytical decision-making ability of human drivers, there will be numerous ongoing daily situations which will frustrate the ability of a full autonomous vehicle to properly and dynamically respond to, or react to, its surroundings. Moreover, until autonomous vehicles can safely rely upon existing operational systems and sensors for safe and efficient operation and eliminate essentially all risks, the public will continue to be hesitant to put full faith in true autonomous operation of such vehicles. Indeed, numerous "real-world" autonomous vehicular tests have resulted in guidance failures, accidents, etc., caused by guidance systems and sensors that have failed to adequately detect, recognize and/or react in a timely fashion due to challenging ambient conditions, and as a result, most autonomous vehicle testing is usually limited to warm, sunny climate areas.

While various optically-based automotive and/or autonomous guidance systems and sensors (e.g., video, LIDAR, etc.) are capable of performing well under ideal visual and ambient conditions, their capabilities can quickly diminish to unusable levels under adverse ambient conditions, such as during or shortly after rain, snowfall, fog, etc., or when it is dark outside and in low-lighted areas of the roadway. Additionally, while the existing level of "on-board" sensors, cameras, devices, and interfaces can alter an autonomous vehicle's driving characteristics to a limited degree (e.g., by braking for unexpected obstacles and/or other vehicles, or steering a vehicle if it drifts out of its lane, or adjusting the propulsion of the vehicle, etc.), there is currently an inherent extreme deficiency in giving autonomous vehicles the ability to react properly to harsh ambient conditions, such as fog, snow, heavy winds or extreme darkness, that can confuse or render useless many optically dependent sensors. Existing GPS navigation systems alone, and high-resolution digital maps cannot be absolutely relied upon, as their databases do not cover the majority of roadways, and are constantly becoming outdated. Accordingly, there is a need to improve upon existing optically-based guidance systems and sensors to ensure that operation of an autonomous vehicle is safe and efficient in all conditions.

Accordingly, there is a need for an improved system for the operation of autonomous vehicles, as well as manually driven vehicles, to continue to properly guide themselves during conditions on a roadway that overcomes the drawbacks and limitations of existing dynamic guidance systems. Further, there is a need for a system that utilizes infra-red detection and imaging with sensors that can assist in the safe and efficient operation of vehicles in response to unexpected and unpredicted situations or conditions on a roadway, and that will aid the vehicles in determining appropriate responsive actions in a quick and expeditious manner.

SUMMARY

The present disclosure is generally directed to a passive infra-red guidance system for augmenting the operation of vehicles on a roadway. In accordance with embodiments of the present disclosure, the system provides a superior approach to assist a vehicle or driver in finding and determining the center point of an established travel lane when the roadway visibility, in general, is low, less than optimal, or otherwise compromised, and when the performance of other navigation systems may be diminished or ineffectual, and instantly respond to any detected guidance deviation.

Central to the operation of the system in accordance with the present disclosure is the use of at least one forward-looking passive infra-red (IR) image sensor mounted on a vehicle that is in operative communication with an image processor tied into the operational system of the vehicle, such as via a central CAN Bus unit in constant communication with various vehicle sensors, such as the IR sensors, for analysis and output processing, preferably immediately in real-time. In operation, the image processor analyzes the radiated thermal differences between a roadway's surface and areas adjacent to the roadway, which subsequently provides a data "picture" of where a roadway and/or a travel lane exists and ends. More particularly, the image processor, based on data measured by the at least one IR sensor, establishes a left edge line and a right edge line of the roadway, and then determines a centerline for a travel lane in which the vehicle is travelling. This information may be used to provide, for instance, a "heads up" display outlined on the windshield of a driven vehicle, or as a data input to the operating and/or navigation system of an autonomous vehicle. Though preferably used in autonomous vehicles, the system of the present disclosure can also be used in human-operated vehicles as an adjunct to a human driver, who, like the autonomous vehicle system, cannot properly identify the vehicle's position relative to the travel lane(s) on a snow- and/or ice-covered, or foggy, or poorly lit, or damaged roadway travel lane by optical means.

In an embodiment of the present disclosure, a method for centrally locating a vehicle within an established travel lane on a roadway comprises determining the left edge and the right edge of the roadway using thermal imaging, and then determining the centerline of the travel lane based on the determined left and right edges of the roadway. The method further comprises comparing the determined centerline of the travel lane with the actual position of the vehicle, and then identifying any adjustment for the vehicle's position based on the comparison.

In another embodiment of the present disclosure, a method for centrally locating a vehicle within a travel lane on a roadway comprises determining the left edge and the right edge of the roadway using a thermal imaging sensor assembly disposed on the vehicle, and then determining the centerline of the travel lane based on the determined left and right edges of the roadway. Depending on the curb-to-curb width divided by the typical travel lane width would allow the system to determine the number of travel lanes on an obstructed (e.g., snow-covered) roadway. The method further comprises comparing the determined centerline of the travel lane with the actual position of the vehicle, and then identifying any adjustment for the vehicle's position based on the comparison. The method further comprises initiating a response in the vehicle's operation based on the identified adjustment.

In another embodiment of the present disclosure, a system for centrally locating a vehicle within a travel lane on a roadway comprises a thermal imaging sensor assembly disposed on the vehicle and comprising at least one infra-red sensor for thermal imaging the roadway ahead of the vehicle. The system further comprises an image processor in operative communication with the thermal imaging sensor assembly for imaging the roadway on the left and right sides of the vehicle, respectively. More particularly, the image processor determines the centerline of the travel lane in the roadway based on thermal imaging signals received from the thermal imaging sensor assembly associated with the left and right edges of the roadway. The system further comprises a central vehicle control system in operative communication with the image processor for adjusting the vehicle's position within the travel lane using the vehicle's guidance system based on a comparison of the vehicle's actual position and the determined centerline of the travel lane.

In another embodiment, the image processor can identify a de facto travel lane (or ad hoc "path") created by one or more vehicles that have recently travelled in front of the vehicle. More particularly, the system can identify, using at least one forward-looking passive infra-red sensor mounted to the vehicle, residual tire heat from tire tracks within the de facto travel lane, especially where there is a contrast between the thermal signature left by the tire tracks of preceding vehicles and the roadway and/or snow or other roadway surface coatings. The image processor can determine from the previously identified tire tracks an optimal travel "path" and determine a centerline for continued travel.

In another embodiment, the image processor can identify a de facto travel lane (or ad hoc "path") created by one or more vehicles that have recently travelled in front of the vehicle by identifying, using at least one forward-looking passive infra-red sensor mounted to the vehicle, residual heat from a prior vehicle's tires having compressed water, snow, or ice during their rotation thus heating the area of their tire tracks creating a thermally contrasting de facto travel lane between the thermal signature left by the tire tracks of the preceding vehicle(s) and the undisturbed water, snow, ice or other roadway surface coatings. The image processor can determine from the previously identified tire tracks an optimal travel "path" and from these tracks, create a centerline for continued travel.

Unlike LIDAR or other "active" systems that continually radiate LASER or Radio Frequency energy and process the reflections of this energy, the Passive Infra-Red Guidance System in accordance with the present disclosure relies on passively detecting and processing contrasting thermal emissions around a vehicle.

In accordance with the present disclosure, said vehicle response can take the form of providing direct input to a vehicle's "Driver Assist" steering system, propulsion system, and/or automatic activation of a vehicle's braking system. The system is designed to be an adjunct to other sensors and guidance systems on a vehicle during times of challenging ambient conditions, and as such enhances an autonomous vehicle's autonomous guidance system.

The system in accordance with the present disclosure is capable of working with both manually driven, as well as autonomous vehicles.

In accordance with the present disclosure, the image processor can identify a de facto travel lane (or ad hoc "path") based on a heat differential between untreated and treated areas of a roadway which occurs as a result of a striped or other application of liquid "melting agents" being placed upon the established travel lanes of roadways. More particularly, the system can identify, using at least one forward-looking passive infra-red sensor mounted to the vehicle, the heat differential from the interaction between these ice/snow melting agents and liquid or frozen moisture and the untreated areas of a roadway, thus identifying a de facto travel lane that generally mirrors the extent and boundaries of a travel lane(s). The image processor can determine from the heat signature of the chemical application an optimal travel "path" and determine a centerline for continued travel, regardless of frozen precipitation covering a roadway.

In accordance with the present disclosure, the vehicle guidance system can allow for the automatic selection of either the tracking of previous tire tracks or the tracking of the treated area of a roadway, with the system selecting the tracking method based on whichever method yields the strongest thermal differential information. The system is also capable of automatically determining a preferred roadway bias, i.e. in a given direction offering guidance preference to travel in the left lane (or left roadway area bias), preference to travel in the center of the roadway lane (or center area bias), or preference to travel in the right lane (or right roadway area bias). For driven or "semi" autonomous operation (i.e. low level autonomous operation), depending on the host-vehicle's equipment and capabilities, the system can operate in a "correction" or mild override manner whereby it can feed the video processor data to the host vehicle's guidance system to provide an automatic correction or "nudging" to a vehicle's direction, or allowing a "hands off" steering system to automate the roadway guidance process under frozen precipitation conditions. In a traditional manual driving mode or with assisted steering input, the use of a 'head-up" or transmissive windshield display indicating a left/right variance from the detected lane may be optionally provided as well. Even in a driven mode, the system may allow for either manual or automatic selection of roadway area bias.

The present disclosure also provides systems and methods for automatic travel lane selection biasing amongst thermally detected lanes to assist autonomous vehicles or driven vehicles to determine which lane(s) are appropriately selected for travel.

Objects, features and advantages of the present disclosure will become apparent in light of the description of embodiments and features thereof, as enhanced by the accompanying figures.

DETAILED DESCRIPTION

Figure 1:
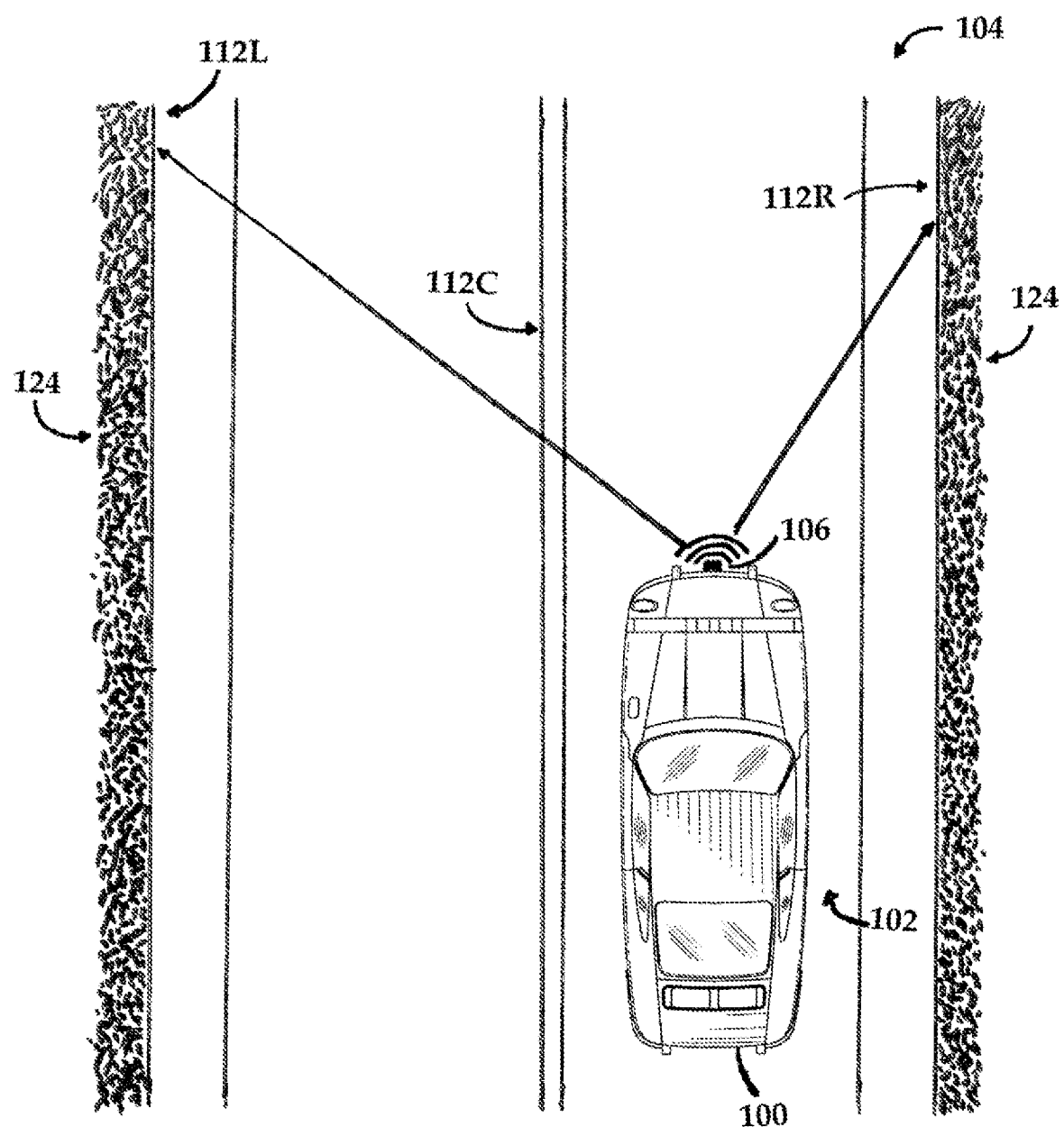
FIG. 1 provides an illustration of a vehicle on a roadway using the passive infra-red guidance system in accordance with an embodiment of the present disclosure to determine a centerline of the travel lane in which the vehicle is travelling.

In the drawings, like reference numerals refer to like features of the systems of the present application. Accordingly, although certain descriptions may refer only to certain figures and reference numerals, it should be understood that such descriptions might be equally applicable to like reference numerals in other figures and other embodiments.

Figure 2:
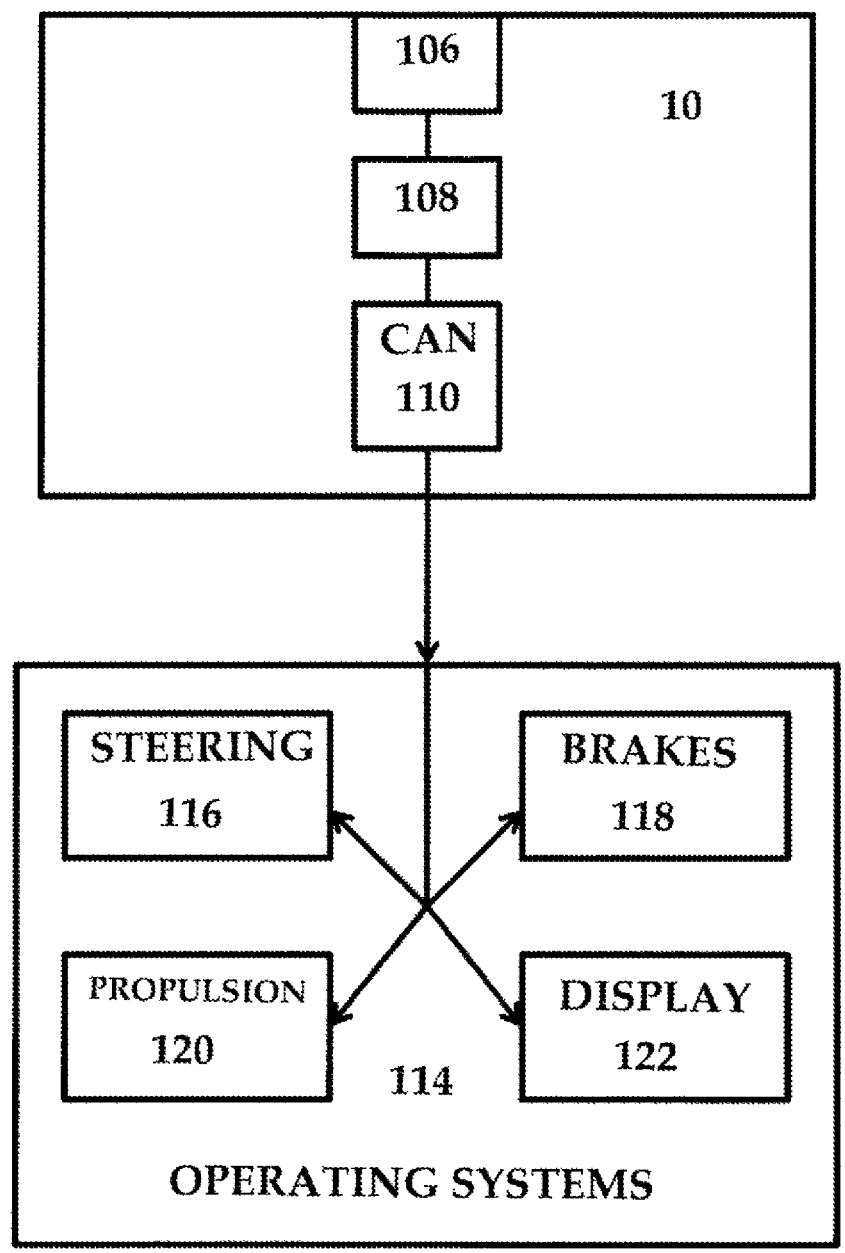
FIG. 2 provides a schematic generally illustrating the passive infra-red guidance system of FIG. 1.

Referring to FIGS. 1-2, a first operational mode of a passive infra-red guidance system in accordance with the present disclosure is illustrated. As illustrated in FIG. 1, a vehicle 100 generally travels within a travel lane 102 on a roadway 104. The system, generally designated by reference numeral 10, comprises at least one forward-looking passive IR imaging sensor or sensor array, generally designated as reference numeral 106, mounted on the vehicle 100 and directed in outwardly front of the vehicle 100 so that it can identify the edges of the roadway 104 or travel lane 102. In preferred embodiments of the present disclosure, as illustrated in FIG. 1, a single, forward-looking IR sensor 106 is mounted on the vehicle 100, preferably on the front of the vehicle 100, and more preferably centered on the vehicle 100 so that it can measure both the left and right sides of the roadway 104 in front of the vehicle 100 during travel. Such a forward-looking IR sensor 106 would generally cover a relatively close range in front of the vehicle 100—about 10 to 20 feet in front of the vehicle 100. Optimally, the IR sensor 106 has a relatively large pixel array, for example, about 640×480 or greater.

Figure 5:
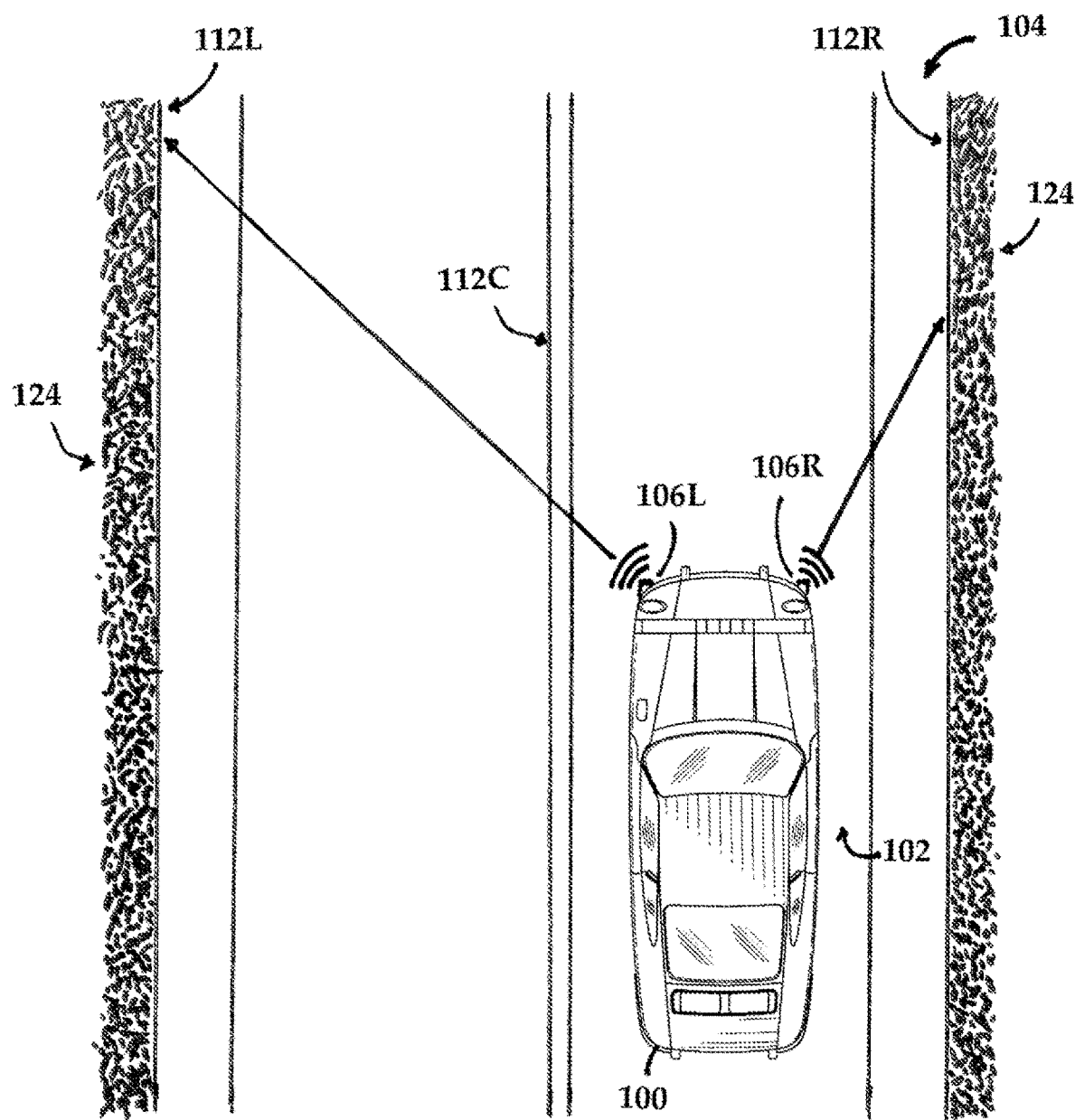
FIG. 5 provides an illustration of a vehicle on a roadway using an alternate embodiment of the system in accordance with the present disclosure to determine a centerline of the travel lane.

In alternate set-ups of the thermal imaging sensor assembly, multiple forward-looking IR sensors 106 can be mounted to the vehicle 100, preferably in over-lapping and/or redundant fashion. In an alternate embodiment of the present disclosure, as illustrated in FIG. 5, the vehicle 100 may include a dedicated right-side IR sensor 106R—directed toward the right edge of the roadway 104/travel lane 102 in a forward-looking manner—and a dedicated left-side IR sensor 106L—directed toward the left edge of the roadway 104/travel lane 102 in a forward-looking manner. In such an embodiment, the sensors 106R and 106L may be positioned on the front end of the vehicle 100 or alternately on the lateral sides of the vehicle 100, and be directed forwardly from the vehicle 100.

The following discussion of IR sensors in regards to the present disclosure could be a single sensor or a set of sensors operating to a collective end of detecting edges of the roadway 104/travel lane 102 through thermal imaging.

Figure 3:
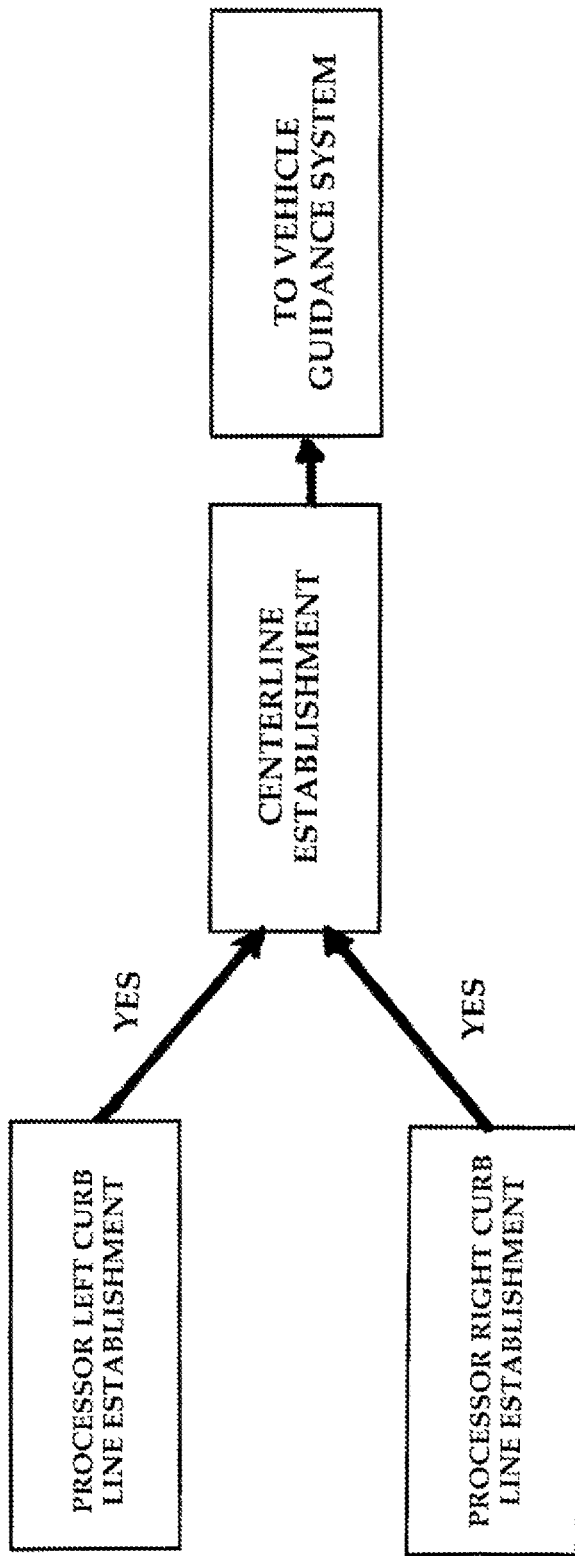
FIG. 3 provides a schematic generally illustrating an embodiment of a centerline determination method in accordance with the present disclosure in order to locate a vehicle on a roadway using curb line detection.
Figure 6:
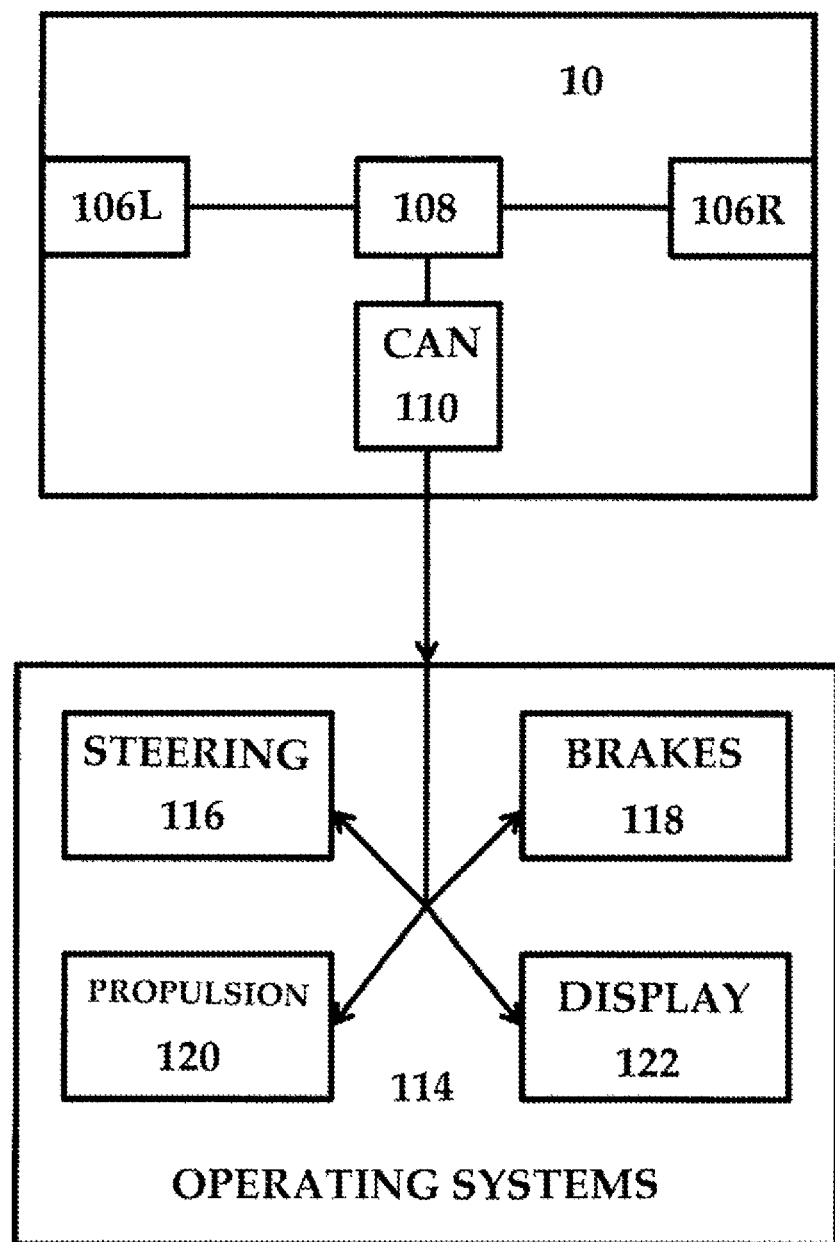
FIG. 6 provides a schematic generally illustrating the passive infra-red guidance system of FIG. 5.

Referring to FIGS. 2 and 6, the IR sensors 106 are in operative communication with an image processor 108, such as a video processor, tied into the operational system of the vehicle 100, such as via a central CAN Bus unit 110. Preferably, the CAN Bus 110 is in constant communication with various vehicle sensors, such as the IR sensors 106, for analysis and output processing, preferably immediately in real-time, based on the detected data. In operation, the system 10 determines the left edge and the right edge of the roadway 104 using thermal imaging. More particularly, the image processor 108 analyzes the thermal differences between a roadway's surface and areas adjacent to the roadway 104, as well as roadway features, such as embedded roadway lane or centerline reflectors, etc., and subsequently creates a data "picture" of where a roadway 104 and/or a travel lane 102 exists and ends. Referring to FIG. 3, the image processor 108 establishes a left curb line 112L and a right curb line 112R based on data received from the IR sensors 106.

As noted, each IR sensor 106 preferably has a relatively large pixel array—e.g., about 640×480 or greater. In operation, the image processor 108 focuses on a subset of the pixels measured by the sensors 106 to identify the left and right edges 112L and 112R of the roadway 104 or travel lane 102. For example, the image processor 108 can look at the left 200 pixels or so to identify the left edge 112L of the roadway 104/travel lane 102 and the right 200 pixels or so to identify the right edge 112R of the roadway 104/travel lane 102. Multiple processors may be used to analyze the sensor data more quickly and efficiently, and so that both the left and right edges 112L and 112R can be analyzed simultaneously.

In embodiments of the present disclosure using multiple IR sensors, such as a dedicated left and right IR sensor 106L and 106R, respectively, the left and right curb lines 112L and 112R will be established based on respective thermal measurements from the sensors 106L and 106R. In this regard, a single image processor 108 may be in operative communication with each of the left and right IR sensor 106L and 106R, or alternatively, a dedicated left image processor and a dedicated right image processor may be used to determine the left and right curb lines 112L and 112R, respectively.

The established curb line information is supplied by the image processor 108 to the CAN Bus 110, which establishes the centerline 112C for the roadway 104 or travel lane 102 depending on the calculated width of the roadway curbs. Upon establishing the centerline 112C, and comparing the vehicle's relative position to the calculated centerline 112C, the CAN Bus 110 supplies adjustment instructions to the vehicle operating and guidance systems, generally designated as reference numeral 114, if such adjustments are needed. Appropriate adjustments can generally include providing direct input to a vehicle's "Driver Assist" steering system 116, automatic activation of a vehicle's braking system 118, or adjustment of a vehicle's propulsion system 120. The information may also be provided as a data input to the navigation system of the autonomous vehicle 100.

As part of the centerline establishment step, the CAN Bus 110 can utilize information from a GPS or navigation system supplied with information about the roadway 104—such as, how many lanes the roadway 104 has; which lanes travel in which direction; whether the vehicle 100 is proximate to or nearing an exit, off ramp, or side street; how large the shoulder is—in order to accurately calculate the centerline 112C for a particular roadway 104 or travel lane 102. In this regard, upon establishment of a left curb line 112L and a right curb line 112R by the image processor 108, the CAN Bus 110 can extrapolate the proper position of the travel lane 102 for the vehicle 100 and the vehicle's relative actual position therein in order to determine if adjustments are needed to move the vehicle 100 left or right within the travel lane 102.

Figure 4:
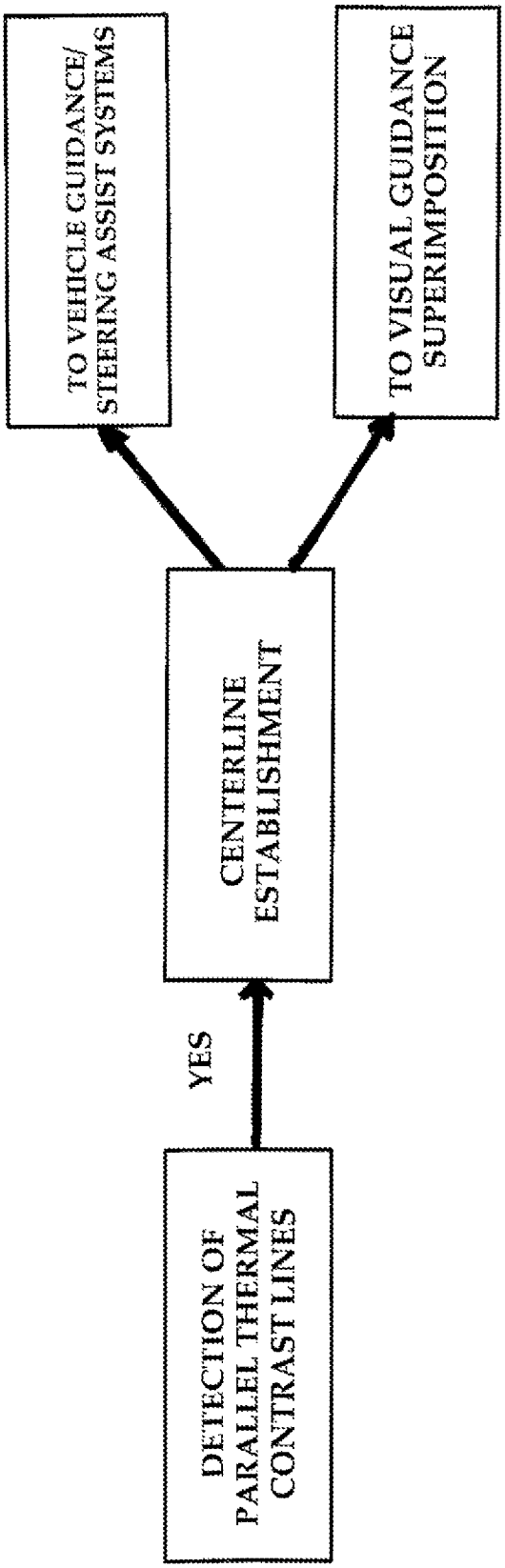
FIG. 4 provides a schematic of an alternate embodiment for locating the vehicle on a roadway using parallel image processors or algorithms.

While generally described herein for use in connection with autonomous—or driverless—vehicles, the system 10 of the present disclosure can also be used in driven vehicles, either having a quasi-autonomous mode or as a back-up redundancy to the human operator. For example, the centerline information and suggested corrective action may be provided, for instance, as a "heads up" display outline 122 on a driven vehicle 100, or as a video or graphic "see-through" OLED panel, or other display method, ideally sandwiched between the layers of the windshield, or as a data input to the navigation system of the vehicle 100, as illustrated in FIG. 4. The driver may be able to adjust the vehicle's position and speed manually, or in the alternative, the vehicle 100 may automatically adjust the vehicle's position and speed based on such continuous monitoring of the vehicle's position. Even during a manually driven mode, the system may be configured to make lane area bias recommendations through the visual display(s) presented to the vehicle driver. The "see-through" OLED panel may also be used to display other vehicle-related information from other vehicle systems.

Typical roadway surface materials present a vastly different emitted thermal characteristic from that of adjacent non-roadway materials and surfaces, and thus present a contrasting thermal picture to an IR sensor 106. For example, during a snow event, an IR sensor 106 can make ready distinctions between the warmer pavement of the roadway 104 and the cooler dirt/grass/vegetation 124 situated on the side of the roadway 104. Alternately, when the roadway curbing is made of material such as granite that has a greater thermal mass than the roadway material, then this type of roadside curbing still thermally contrasts with the roadway surface, just in the opposite direction. It is important to note that in accordance with the present disclosure, it does not matter what the absolute thermal reading of any area or roadway actually is, but rather the system 10 is looking for thermal boundary differences, however subtle, to determine where the roadway edge is located. Of additional note, the image processor 108 is continually and dynamically optimizing the thermal contrast range of the displayed images by utilizing outside ambient temperature data readings from the CAN Bus 110. When this contrasting data is sent and processed by an image processor 108, definitive roadway edge lines 112L and 112R can be determined and used to further determine a centerline 112C of a roadway 104 or travel lane 102, or sent via a vehicle's CAN Bus 110 to be operatively connected to a vehicle's guidance system(s) 114 for autonomous steering, propulsion, and or braking adjustment, or, for example, to a heads-up display 122 superimposed on the windshield of a vehicle 100 for aiding a human driver.

Additionally, the application of typically used solid or liquid melting agents which are applied either before, during, or after snow/ice conditions will contrast with and further enhance the thermal signature of a roadway 104 relative to its adjacent areas 124, and also serve as a powerful de facto initial "marker trail" for the vehicle 100 to follow using the system 10 of the present disclosure.

Figure 7:
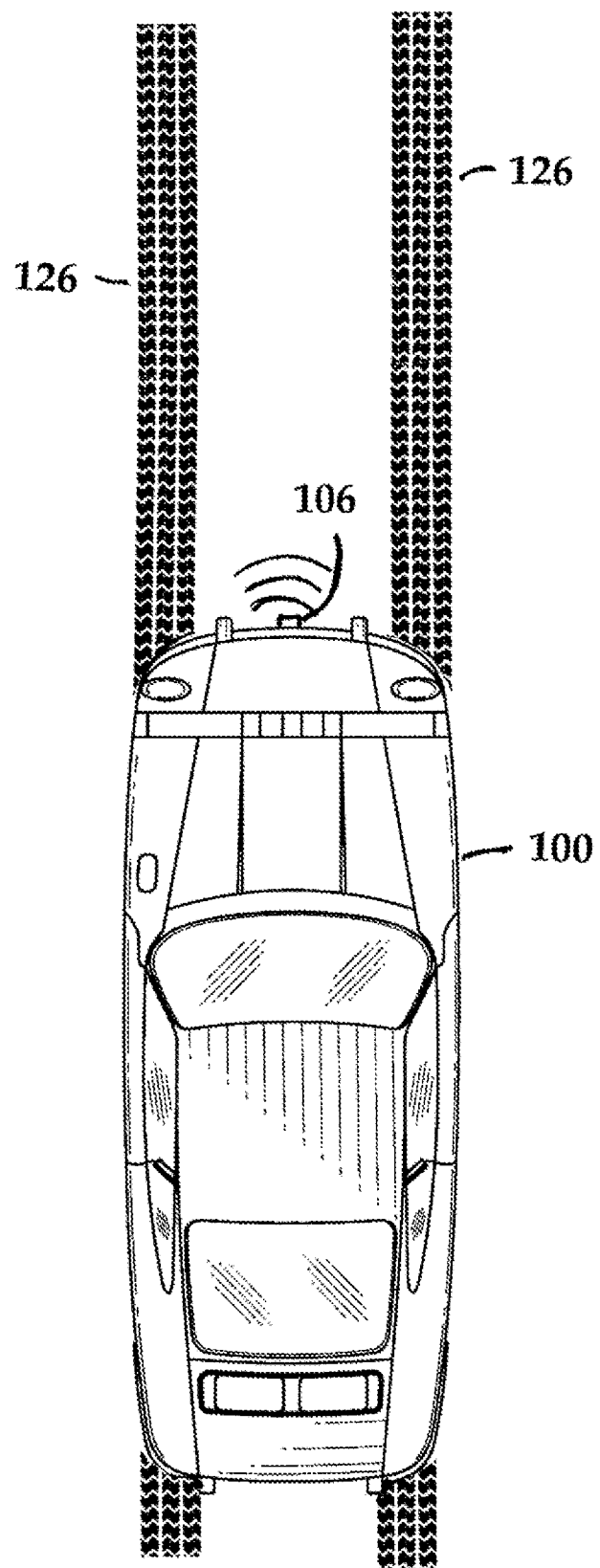
FIG. 7 provides an illustration of a vehicle on a roadway using the system in accordance with an alternate embodiment of the present disclosure to determine a path of travel for the vehicle based on thermal measurement from existing tire tracks of any preceding vehicle(s).

Referring to FIG. 7, an alternate embodiment of the present disclosure, especially useful in difficult road conditions, such as snow- or ice-covered roadways, is illustrated. FIG. 7 essentially illustrates what an IR sensor would see, as well as what would be displayed from the image processor 108, even though such tire tracks would generally be difficult or often impossible to detect in the visible wavelength spectrum as the tracks would typically be the same color as adjacent undisturbed snow, ice, or rain. In such an embodiment, the image processor 108 can supply a vehicle 100 with the ability to identify the ad-hoc "path" created by a previous vehicle's travel, or, as noted above, the prior application of melting agents if there are no prior tire tracks to create a target centerline of this path for an autonomous vehicle 100, or to guide a driver. Intrinsic friction created by the constant flexing of a tire's sidewalls and tread inherently creates heat and a subsequent rise in the internal air temperature of a vehicle's tires, which transfers through the tire's tread onto a dry, rain-covered, or snow- and/or ice-covered roadway surface creating a traceable historic path for a passive IR sensor 106 to detect. Additionally, the pressure of a previous vehicle's tires carrying the vehicle's substantial weight during the compacting of snow, ice, or rain under the tires creates additional pathway heating for the IR sensor 106 to detect.

As noted, such an embodiment is especially useful when a vehicle 100 is travelling on a snow-covered road. Traditional active optical visual sensing systems, such as LIDAR or video cameras, would have an extremely difficult, if not impossible, time differentiating shallow tread depths in the generally monochromatic surface reflectively of a snow-covered roadway 104. The system 10 of the present disclosure, by passively detecting thermal energy created in the tire tracks 126, can create an ad hoc centerline in the middle of the previous tire tracks 126, much as a human driver does in a roadway that has been travelled on, but not yet plowed. In the case of an autonomous vehicle 100, the output generated by the image processor 108 is sent to the vehicle's steering system 116 such that appropriate corrections can be made in the vehicle's operation. In the case of a driven vehicle 100, guidance information can be provided on a Heads-Up display 122 to assist the driver, such as a calculated and/or suggested ad hoc centerline projected on the windshield or left/right guidance arrows. With light snow cover and/or no recent vehicle travel (such that there are no prior tire tracks to follow) or roadway treatment application, the system 10 can revert to measurement of the left and right curb lines 112L and 112R, such as discussed above. However, with snow cover and/or recent travel on the roadway 104, such an alternate centerline determination method can be used for safe and efficient operation of the vehicle 100. Since the system 10 does not utilize visible light wavelengths, its operational ability is exactly the same day or night.

In alternate embodiments of the present disclosure, existing roadway markers or reflectors embedded in the roadway 104 either in the overall roadway centerline and/or the lane markers can also provide a contrasting thermal signature easily detected by the IR sensors 106. In operation, such thermal markers would exhibit a thermal signature that will be different from the surrounding roadway 104. A vehicle 100 can be aware of the general design of the roadway 104 via the navigation system so that the CAN Bus 110, upon receipt of left and right edge data based on measurements of the appropriate markers, can accurately establish a centerline 112C for the roadway 104 or a particular travel lane 102, and determine necessary adjustments accordingly.

The system 10 of the present disclosure is designed to be an adjunct to other sensors and guidance systems during times of challenging ambient conditions, and as such would enhance an autonomous vehicle's guidance system.

Unlike many optically-based guidance systems that have diminished effectiveness at night, especially in poorly light sections of the roadway 104, the system 10 of the present disclosure functions with equal effectiveness day or night, regardless of lighting conditions.

Figure 8:
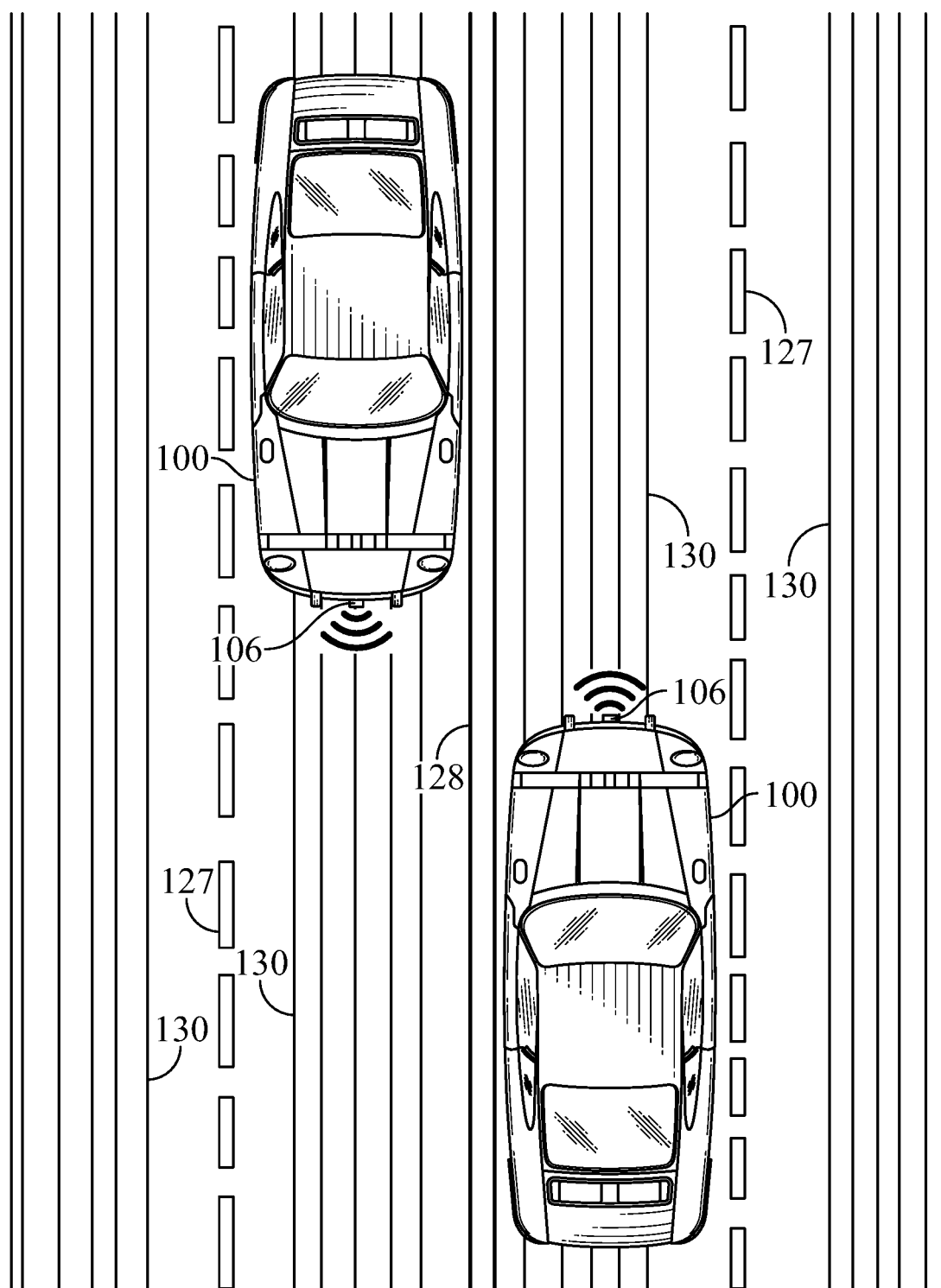
FIG. 8 provides an illustration of a vehicle on a roadway having had a prior application of melting agents using the passive infra-red guidance system in accordance with an embodiment of the present disclosure to determine a centerline of the travel lane in which the vehicle is travelling.

On snow-covered and/or ice-covered roadways, melting agents are often applied to the roadway to improve driving conditions, resulting in one or more melting agent application tracks on the roadway. Sometimes, the one or more melting agent application tracks are applied proactively or preemptively prior to snow or ice accumulation. Referring to FIG. 8, an exemplary embodiment of the present disclosure, especially useful in difficult road conditions, such as snow-covered or ice-covered roadways, is illustrated. The vehicle 100 includes the passive infra-red guidance system 10 for controlling vehicle operating systems 114, as shown in FIG. 2, comprising the passive IR imaging sensor 106, the image processor 108, and the CAN bus unit 110 as discussed above. Like previously described, the IR sensor 106 is configured to detect a portion of the roadway, which may include a portion where melting agent application tracks 130 have been applied. FIG. 8 illustrates what the IR sensor 106 would detect, as well as what would be displayed after processing by the image processor 108 (FIGS. 2 and 6) even though such melting agent(s) application tracks 130 would generally be difficult or often impossible to detect in the visible wavelength spectrum as the melting agent application tracks 130 would typically be essentially transparent to the human eye in most conditions as well as transparent to optical sensors and LIDAR. Untreated and/or undisturbed snow, ice, and/or water may present a thermal contrast compared to treated snow, ice, and/or water, which is configured to be detected by the thermal sensor 106. For example, one or more melting agents may cause the snow, ice and/or water to be exhibit a lower temperature than the untreated snow, ice, water, and/or roadway surface. This temperature differential may last for a significant period of time subject to local conditions, such as vehicle traffic frequency, wind, air temperature, sunny or cloudy weather, etc. Thus, the image processor 108 provides the vehicle 100 with the ability to identify an ad-hoc "path" (or de facto travel lane) between formally established roadway lane markings 127 and lane direction center markings 128 based on the detection of the thermal contrast (or temperature profile) between treated and untreated portions of the roadway after a melting agent treatment. Specifically, the melting agent application tracks 130 that were provided by the prior application of one or more melting agents may be used in conjunction with, or in place of the contrasting thermal signature generated by prior tire tracks 126 (FIG. 7). If there are no prior tire tracks 126 (FIG. 7) to determine a target centerline path for an autonomous vehicle 100, or to guide a driver of a semi-autonomous vehicle or non-autonomous vehicle, then the system may seek to identify the presence of one or more melting agent tracks 130 (or other melting agent application shapes or designs) in order to determine a target centerline path. The target centerline path may be determined based on a determined midpoint of the one or more melting agent tracks 130 in a lateral direction of the roadway, the lateral direction of the roadway being a direction substantially perpendicular to the direction of travel of the vehicle in the roadway. The chemical reactions produced by the presence of moisture upon the chemical agents generates a heat differential between untreated and treated areas of a rain-covered, snow-covered and/or ice-covered roadway surface providing a traceable path for a passive IR sensor 106 to detect. The IR imaging sensor 106 and image processor 108 are configured to detect a temperature profile differential based on the heat differential between untreated and treated areas in order to determine the presence of melting agent application or lack thereof at different portions of the roadway surface.

The system 10 is configured to display a left variance or a right variance alert via an alert system of the vehicle if the actual position of the vehicle 100 is not aligned with the determined target centerline path. The left variance and/or right variance may be displayed on a transmissive windshield display of the vehicle 100, such as a see-through OLED panel arranged on or within the windshield. The transmissive windshield display is particularly useful for a driver or operator of a non-autonomous vehicle, but may be configured for use in semi-autonomous or autonomous vehicles as well. An autonomous vehicle in the context of the present disclosure is configured to operate and navigate a vehicle along a roadway without any input from a driver or operator. A semi-autonomous vehicle in the context of the present disclosure is configured to operate a navigate a vehicle along a roadway with some input from a driver or operator, e.g. the driver or operator may provide acceleration and deceleration inputs via acceleration and brake pedals, respectively, but the vehicle is configured to steer the vehicle for laterally positioning the vehicle in the roadway. A non-autonomous vehicle in the context of the present disclosure requires a driver to provide acceleration input, deceleration input and steering during the course of operation and navigation along the roadway. In the event that ambient conditions one or more sensors of the vehicle to be impaired to an unacceptable extent (e.g. LIDAR or optical camera sensors), the vehicle may allow a transition to the passive infra-red system as its primary navigation system.

Figure 9:
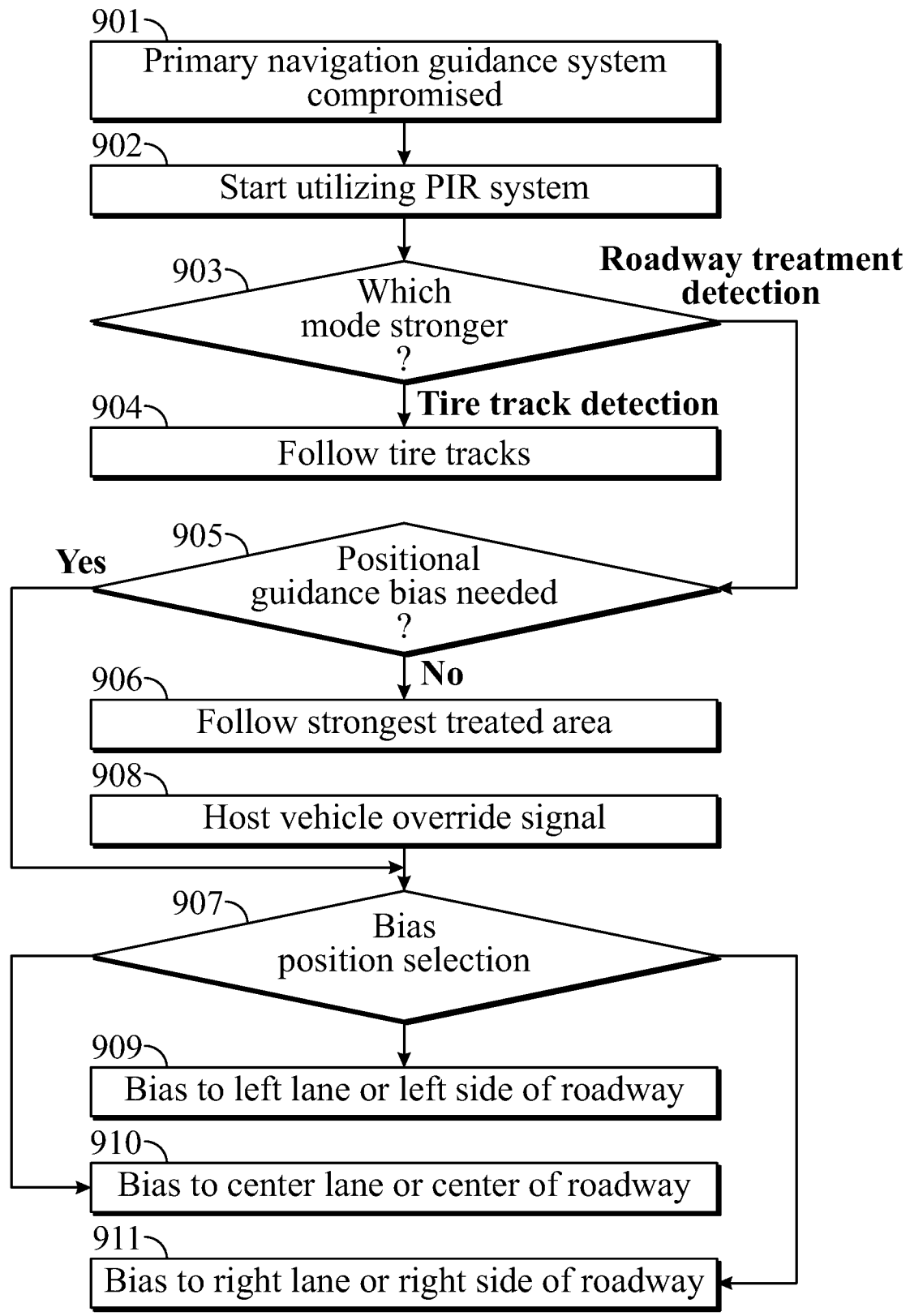
FIG. 9 provides a flow chart illustrating a manual/automatic selection process for a passive infra-red guidance system in accordance with the present disclosure.

Referring to FIG. 9, a flow chart illustrates an exemplary method by which the system 10 of the present disclosure may select various operating modes. The method begins at block 901 where the host vehicle signals to the system 10 that one or more sensors operatively connected to the vehicle's primary navigation guidance system have been compromised and/or are not providing adequate data for navigating the vehicle, e.g. compromised by ambient conditions. At block 902, the method starts utilizing the passive infra-red guidance system 10. The system 10 at block 903 dynamically determines which method (Tire Track Following or Roadway Treatment Following) is to be selected based on which method is most appropriate for the ambient conditions. The selection at block 903 may be determined based on which method provides the stronger contrast, e.g. whether tire tracks, if available, generate a greater thermal contrast with the roadway surface not traveled by a previous vehicle or if one or more melting agent tracks provide a greater thermal contrast with the portion(s) of untreated roadway surface. If the system 10 determines that the Tire Track Following method is providing superior guidance, then that method is enabled at block 904 as disclosed herein. If the system 10 determines that the Roadway Treatment Following method is providing superior guidance, then that method is enabled at block 905 as disclosed herein. Which method is providing superior guidance may be determined based on one or more factors, such as whether the system 10 is detecting tire tracks or roadway treatments as generating the greatest thermal differential profile. The system 10 may be configured to operate autonomously without a positional guidance bias, in which case the method proceeds to block 906 to follow the strongest roadway treatment area as discussed above. If, however, positional guidance is needed or desired, as indicated by manual entry by an operator or by automatic entry by the system 10, then the method proceeds to block 907 to determine the bias position selection. The vehicle at block 908 may signal to the bias position selection block 907 that a system override in the form of a guidance bias needs to be introduced because, for example, of a detected accident or other condition. Based on whether there is a need or desire for a bias position and based on whether a host vehicle override signal is detected from block 908, the method proceeds to block 909 for activation of a left lane or side bias, to block 910 for activation of a center lane or side bias, or to block 911 for activation of a right lane or side bias. A left lane bias (block 909) or right lane bias (block 911) results in the system 10 providing an instruction to laterally adjust a determined center line of travel for the vehicle a predetermined amount. A center lane bias (block 910) results in the system 10 determining the center line of travel of the vehicle to be aligned with a mid-point of the detected roadway treatment(s). The bias position selection allows for some operators (or drivers) to deviate from a strongest treated area of a roadway. For example, sometimes the strongest treated area of the roadway may have the most traffic and have slower travel speeds due to one or more vehicles traveling in that area (e.g. vehicles with two-wheel drive, no snow tires, etc.). Vehicles (e.g. trucks or SUVs with greater traction or four-wheel drive capability, etc.) that wish to avoid that travel area with traffic may manually enter at block 905 a bias position in order to instruct the vehicle to avoid that strongest treated area.

In some embodiments, host vehicle override signal supplied from block 908 take priority to any positional guidance bias entered manually or entered automatically by the system 10 from block 905 in the bias position selection at block 907. For example, if the positional guidance bias entered indicates an instruction to bias to right lane or right side of roadway (block 911), but a host vehicle override signal from block 908 indicates that no right bias should be performed because of an accident or other condition is detected, then bias position selection block 907 does not choose to proceed to block 911, but follows the strongest treated area at block 906 or maintains a center lane or center or roadway bias at block 910.

Figure 10:
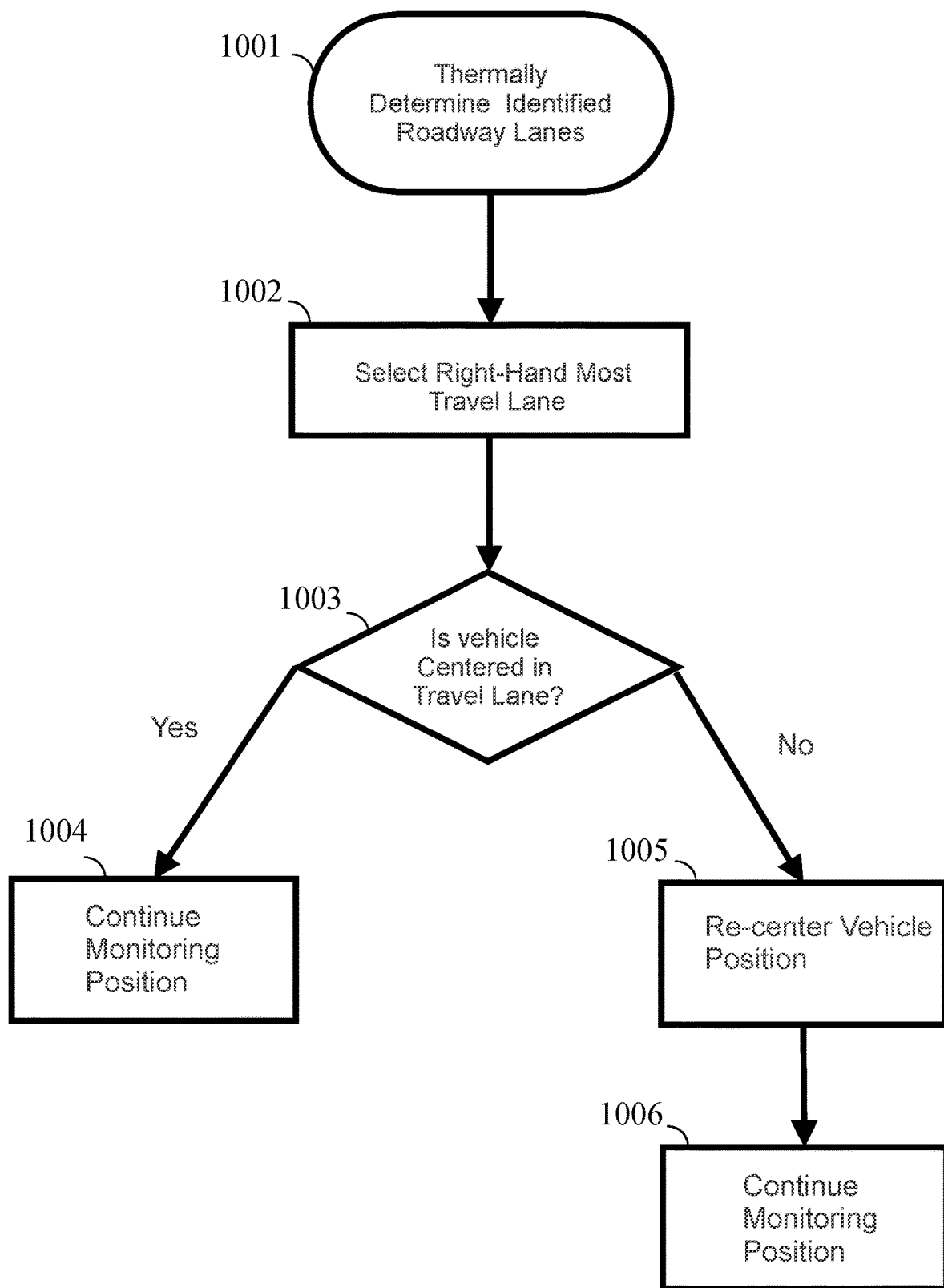
FIG. 10 provides a flow chart illustrating an automatic lane selection process for a passive infra-red guidance system in accordance with the present disclosure.

Referring to FIG. 10, a flow chart illustrating an automatic lane selection process for a passive infra-red guidance system in accordance with the present disclosure is shown. The method begins at block 1001 where the system thermally determines identified roadway lanes. Then at block 1002 the system selects the right-hand most travel lane (of the thermally identified roadway lanes of block 1001). Then at block 1003 the system determines whether the vehicle is centered within the selected travel lane. If the system determines "Yes" the vehicle is centered within the selected travel lane, the method proceeds to block 1004 and continues monitoring for continuous monitoring/adjustment. If the system determines "No" the vehicle is not centered within the selected travel lane, the method proceeds to block 1005 and the system re-centers the vehicle position within the selected travel lane; then the method proceeds to block 1006 and continues monitoring for continuous monitoring/adjustment. The re-centering/adjusting of the vehicle position laterally within the selected travel lane may be through physical control of the vehicle and/or through data input to a navigation system of the vehicle as disclosed above and herein.

The overall thermal travel lane centering method is configured to be performed by a system of the present disclosure based on the detection of linearly applied (although other application geometries are within the scope of the present disclosure) roadway melting agents such as liquid sodium chloride (brine), Magnesium Chloride, Beet Juice, and/or Calcium Chloride. These melting agent products in liquid form (or other form(s)) can be used as roadway pre-treatment agents as well as roadway treatment agents. These exemplary agents cause snow and ice melting to occur at lower temperatures than traditional rock-salt, thus further enhancing the temperature contrast between the agents in their activated state and that of untreated snow and ice.

There are times when the application process of linear and/or general melting agents upon roadways and/or specific travel lanes within the roadway have not been fully completed. When situations such as this occur with some of the travel lanes having been treated while others remain untreated. For instance, one or more lanes of a four-lane roadway may not be treated and there is the potential to cause roadway thermal detection systems to become confused or misinformed as to which treated (and identified) travel lanes are associated with other travel lane(s) in a particular travel direction.

During times that roadways are not optically compromised such as at above freezing temperatures, roadways are marked with "center of roadway" single or double lines. During snow-covered conditions, although travel lanes are specifically treated with melting agents, the center point of a roadway is often not specifically treated. In such situations, especially when operating on roadways without a center median, proper navigation can be severely compromised.

Without a passive infra-red guidance system (PIRGS) (for either driven vehicles or autonomous vehicle navigation systems) snow-covered roadways essentially appear as a "blank canvas." However, with a PIRGS according to the present disclosure, while the treated travel lanes are clearly defined, there still is a need to differentiate and associate lanes intended for a particular traffic flow travel direction.

In a fully treated roadway condition, a "balance" exists between the one or more travel lanes in one travel direction and the travel lanes in the opposite direction. In such a situation, it is readily apparent to a PIRGS which lanes are associated with which travel direction as the number of travel lanes would typically be equally split as to travel direction. Depending on which country the system was operating in, the system assigns a lane selection bias, i.e. left-hand traffic (LHT) bias or right-hand traffic (RHT) bias based on whichever would be appropriate to the local traffic orientation, which may be predetermined by a manufacturer or technician. Existing systems such as GPS, cellular networks, etc. allow the system to automatically select either left-hand traffic or right-hand traffic operating parameters by using a location of the vehicle or communication with a cell tower with a known location. For simplification purposes we will assume all operation in this discussion will be for right-hand traffic bias operation.

In a situation where all of the travel lanes have not been treated with melting agents, for example, on a two lane (per direction) roadway where two lanes in one direction have been treated, but only a single lane in the other direction treated, this can cause much confusion, thus the need for an automatic lane assignment functionality that works with a PIRGS to further augment travel under such conditions.

This disclosure provides an enhanced passive infra-red guidance system (PIRGS) that may operate during periods of frozen precipitation when such precipitation covers roadway surfaces thus making a vehicle's positioning on the roadway challenging and/or impossible to readily determine, especially with autonomous vehicles. The system thermally is able to determine where melting agents have been applied, thus allowing the location of such melting agents to serve as a proxy for the travel lane positions as melting agents are normally placed in the middle of travel lanes.

Analogous to directly sensing (detected) the visible roadway lane markings (when ambient conditions allow) and using these detected markings to make lane navigation decisions, a PIRGS according to the present disclosure operates in an analogous fashion utilizing the location of melting agents to serve as a travel lane proxy center upon which lane navigation decisions are based.

The number of travel lanes in each direction determines how the system functions. If a vehicle is operating on a "single lane" (in each direction) roadway, then the system would then select the right-hand most lane (right-hand bias) with which to operate in. In the case of a "double lane" (in each direction) roadway, there is a chance of both lanes in the same direction of travel having being treated first, so the system is configured to first determine which side of the center line of a roadway (relative to the direction of travel) any identified travel lanes are located. As the PIRGS is configured to determine a roadway center point through roadway edge detection ability, if any treated lanes are identified as being located on the opposite side of the roadway centerline based on the left and right roadway thermal edge detection, the system is configured to trigger, in the case of a driven vehicle, a driver alert warning if the driver attempts to use such "left of center" lanes. In the case of an autonomous vehicle (AV), the system is configured to automatically prevent an AV from navigating over to (and using) a travel lane that is located on the opposite side of the roadway centerline.

Regardless of the number of thermally detected travel lanes per direction, the system by default selects the right-hand most lane of those detected in the present direction of travel from amongst the thermally determined travel lanes. The right-hand most lane in the direction of travel should be understood to be amongst those lanes that have been thermally determined by the system and may be different from the actual physical "right-hand most" lane if, for instance, just the left-hand most lane in a certain direction has been treated and thus it is the only lane detected by the system in that direction then it is considered the right-hand most lane.

There are navigation systems that are currently in use that detect a drift away from a present travel lane and at a certain point "nudge" or correct for the determined drift. Such systems use a forward looking interior mounted video camera to visibly capture roadway markings. A PIRGS or method according to the present disclosure is configured to function in an analogous manner but use an external thermal sensor to detect a pathway drift away from a thermally detected roadway determination as determined by the PIRGS to automatically keep a vehicle centered based on thermal differences. Unlike prior art that makes a location drift determination based on detecting a vehicle's instant position relative to fixed roadway markings, PIRGS dynamically makes a travel lane location determination based solely upon the location of melting agents which may differ somewhat from said fixed roadway markings. Said system may be used by both driven vehicles in manually steered mode and level 2 mode in addition to use by fully autonomous vehicles.

The foregoing description of embodiments of the present disclosure has been presented for the purpose of illustration and description. It is not intended to be exhaustive or to limit the claims to the form disclosed. Obvious modifications and variations are possible in light of the above disclosure. The embodiments described were chosen to best illustrate the principles of the present disclosure and practical applications thereof to enable one of ordinary skill in the art to utilize the invention in various embodiments and with various modifications as suited to the particular use contemplated.

What is claimed is:

1. A method for centrally locating a vehicle on a roadway, said method comprising:
   identifying the presence of one or more melting agents on the roadway using thermal imaging;
   determining the left edge of the roadway and the right edge of the roadway using thermal imaging;
   determining a travel path based on the identified one or more melting agents and the determined left and right edges of the roadway;
   determining a target centerline of the travel path;
   comparing the determined target centerline of the travel path with an actual position of the vehicle; and
   identifying any adjustment for the vehicle's position based on the comparison.

2. The method according to claim 1, wherein the identifying the presence of the one or more melting agents comprises using a thermal imaging sensor assembly disposed on the vehicle.

3. The method according to claim 2, wherein the thermal imaging sensor assembly comprises at least one forward-looking infra-red imaging sensor mounted to the vehicle.

4. The method according to claim 3, wherein the at least one infra-red sensor comprises:
   a left infra-red sensor mounted on the left side of the vehicle configured for thermal imaging a portion of the roadway on the left side of the vehicle; and
   a right infra-red sensor mounted on the right side of the vehicle configured for thermal imaging a portion of the roadway on the right side of the vehicle.

5. The method according to claim 1, wherein the identifying the presence of the one or more melting agents comprises identifying a thermal difference between a first thermal signature on a portion of the roadway without the one or more melting agents, and a second thermal signature on a portion of the roadway where the one or more melting agents are present.

6. The method according to claim 1, further comprising providing adjustment guidance information for adjusting a lateral position of the vehicle within the roadway based on the identified adjustment using a guidance system of the vehicle, wherein the adjustment guidance is based on the target centerline being determined to be at a midpoint of the one or more melting agents in a lateral direction of the roadway.

7. The method according to claim 6, wherein the adjustment guidance information presented to the host vehicle is ignored for a pre-set time or travel distance of the vehicle if the adjustment guidance information would result in a sudden extreme deviation.

8. The method according to claim 1, wherein the left and right edges of the roadway are located at material interfaces between different materials, wherein the determining of the left edge of the roadway and the right edge of the roadway is based on identifying a radiated temperature difference between a first thermal signature of a first material of the different materials and a second thermal signature of a second material of the different materials.

9. The method according to claim 1, wherein the vehicle is an autonomous vehicle.

10. The method according to claim 1, wherein the vehicle is a non-autonomous vehicle.

11. The method according to claim 10, further comprising providing a left variance alert or a right variance alert to an operator of the vehicle based on the identified adjustment.

12. The method according to claim 1, wherein the determining of the travel path comprises selecting a right most travel path of a plurality of travel paths.

13. The method according to claim 1, wherein each travel path of the plurality of travel paths correspond to a different group of melting agent tracks.

14. A system for centrally locating a vehicle on a roadway comprising:
   a thermal imaging sensor assembly disposed on the vehicle;
   an image processor in operative communication with the thermal imaging sensor assembly for determining a centerline of a travel path based on thermal imaging signals received from the thermal imaging sensor assembly associated with one or more melting agents arranged on the roadway and based on thermal imaging signals received from the thermal imaging sensor assembly associated with the left and right edges of the roadway; and
   a central vehicle control system in operative communication with the image processor for adjusting a lateral position of the vehicle within the roadway using a guidance system of the vehicle based on a comparison of an actual position of the vehicle and the determined centerline of the travel path.

15. The system according to claim 14, wherein the thermal imaging sensor assembly comprises at least one forward-looking infra-red thermal imaging sensor.

16. The system according to claim 14, wherein the thermal imaging sensor assembly comprises:
   a left infra-red sensor mounted on a left side of the vehicle configured for thermal imaging a portion of the roadway on the left side of the vehicle; and
   a right infra-red sensor mounted on a right side of the vehicle configured for thermal imaging a portion of the roadway on the right side of the vehicle.

17. The system according to claim 14, wherein the thermal imaging sensor assembly is configured to detect a first thermal signature on a portion of the roadway where one or more melting agents are arranged and a second thermal signature on a portion of the roadway without the one or more melting agents.

18. The system according to claim 14, wherein the central vehicle control system is configured to adjust the lateral position of the vehicle in the roadway by providing input to a steering system of the vehicle, by activating a braking system of the vehicle, and/or by activating a propulsion system of the vehicle.

19. A system for centrally locating a vehicle on a roadway comprising:
   a thermal imaging sensor assembly disposed on the vehicle;
   an image processor in operative communication with the thermal imaging sensor assembly for determining a centerline of a travel path based on thermal imaging signals received from the thermal imaging sensor assembly associated with one or more melting agents arranged on the roadway and based on thermal imaging signals received from the thermal imaging sensor assembly associated with the left and right edges of the roadway; and
   an alert system in operative communication with the image processor for providing a left variance alert or a right variance alert based on a comparison of an actual position of the vehicle and the determined centerline of the travel path;

wherein the image processor is configured to calculate a width between the curbs of the roadway based on the determined left and right edges of the roadway in order to determine the centerline of the travel path.

20. The system according to claim 19, wherein the alert system comprises a transmissive windshield display, and wherein the transmissive windshield display is configured to display the left variance alert or the right variance alert.

\* \* \* \* \*

UNITED STATES PATENT AND TRADEMARK OFFICE
CERTIFICATE OF CORRECTION

| | | |
|---|---|---|
| PATENT NO. | : 11,554,775 B2 | Page 1 of 1 |
| APPLICATION NO. | : 17/713151 | |
| DATED | : January 17, 2023 | |
| INVENTOR(S) | : Arnold Chase | |

It is certified that error appears in the above-identified patent and that said Letters Patent is hereby corrected as shown below:

On the Title Page

Item (60) should read:
(60) Provisional application No. 62/670,209, filed on May 11, 2018.

Signed and Sealed this
Eleventh Day of April, 2023

*Katherine Kelly Vidal*

Katherine Kelly Vidal
*Director of the United States Patent and Trademark Office*